UNITED STATES PATENT OFFICE.

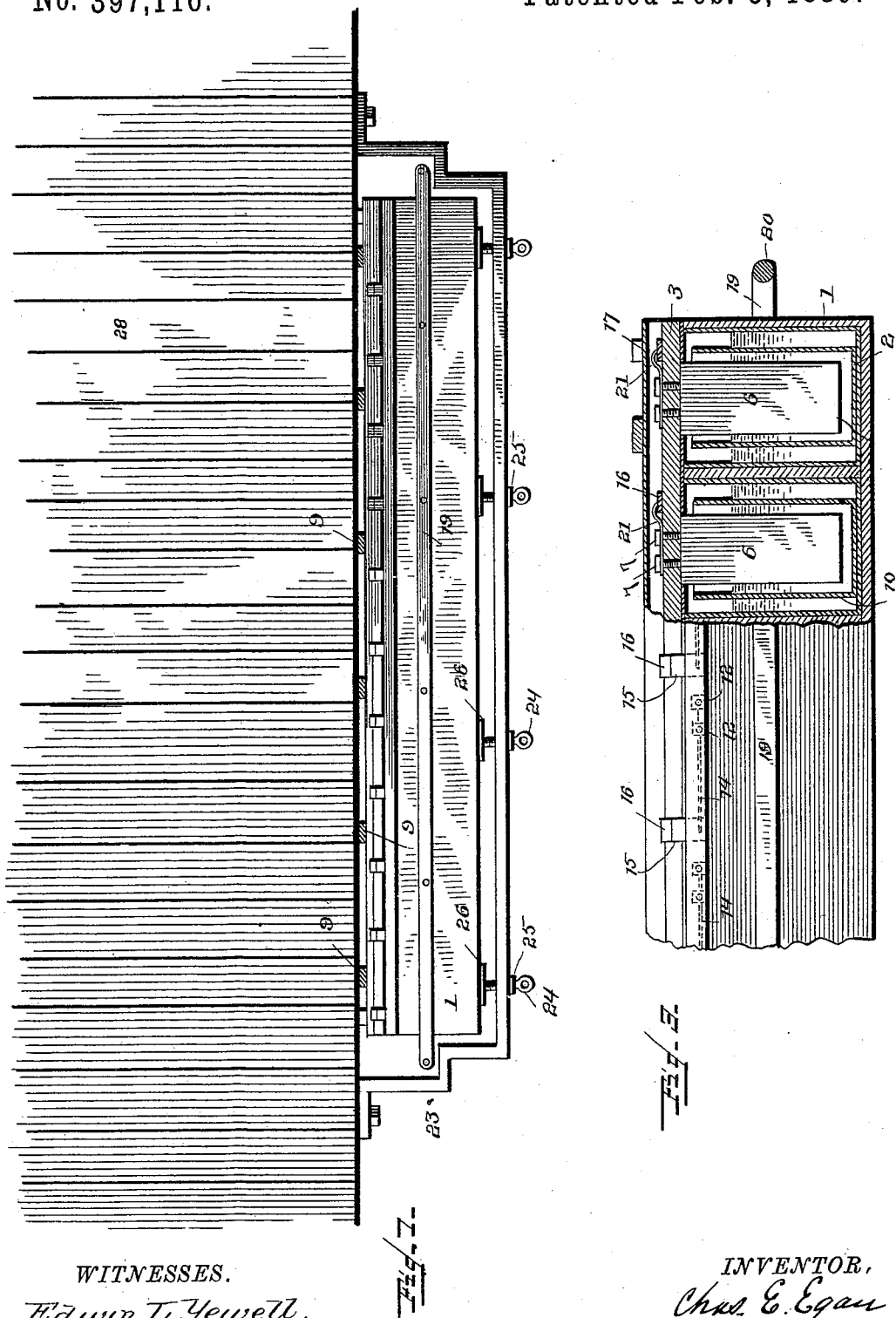

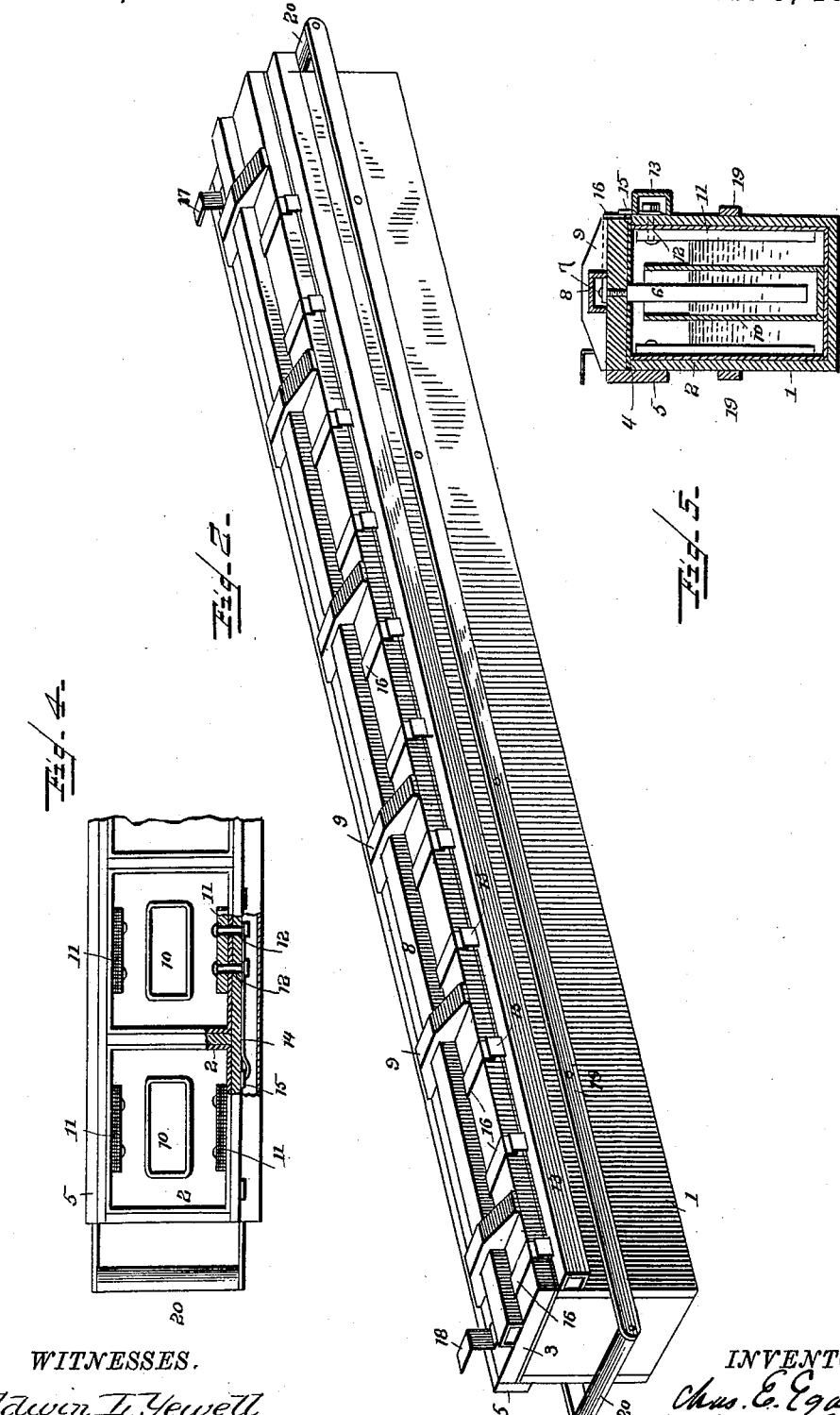

CHARLES E. EGAN, OF COLUMBUS, OHIO, ASSIGNOR OF ONE-FORTIETH TO JOHN D. H. McKINLEY, OF SAME PLACE.

GALVANIC BATTERY.

SPECIFICATION forming part of Letters Patent No. 397,116, dated February 5, 1889.

Application filed July 9, 1888. Serial No. 279,427. (No model.)

*To all whom it may concern:*

Be it known that I, CHARLES E. EGAN, a citizen of the United States, residing at Columbus, in the county of Franklin and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to galvanic batteries, and more particularly to that form in which a number of cells are grouped in the same apparatus for convenience of manipulation as an entirety.

My battery is more particularly designed for use in connection with electric lighting in isolated plants where other forms or modes of electric generation are impracticable from an economic standpoint.

My battery is especially designed for use in car-lighting, the apparatus being so arranged that a group of cells can be handled as an entirety and readily placed in operative relation to the car-circuits and removed therefrom for purposes of renewal of the exciting-fluid or repairs to the apparatus when either may become necessary, though of course it may be advantageously applied to any use for which ordinary batteries are capable.

In batteries as heretofore constructed, where a sufficient number of cells to give a current strong enough to meet any considerable requirement of work were collected in a single apparatus, trouble has always been experienced in the use of the cells from leakage of the exciting-fluids or difficulty of replacement when spent, also from a lack of conveniences for handling the cells; and in other cases, where the cells are subjected to jars or shocks, spilling of the acids or other exciting solutions has been a source of great annoyance. These difficulties have operated to prevent the application of galvanic batteries in fields of usefulness where they might be economically employed. Another difficulty, and a very important one, resided in the exciting solution itself, by reason of its rapid exhaustion, wide change of resistance, and short-lived depolarizing-power.

It is the object of my invention to overcome these difficulties; and to this end my invention embodies structural features which render a group of cells convenient of manipulation, durable, safe against derangement in transit on a car, and readily placed in and withdrawn from the circuit which it supplies with electric energy, and, second, in an improved battery solution which will be an active depolarizer and will not be rapidly exhausted. In practicing my invention I make a trough or box of some durable material and divide it by partitions into a suitable number of cells. The cells are lined with lead and a series of negative elements—as carbon—firmly secured along both sides by bolts or screws.

The cover is made to fit the trough, and the trough and cover are provided with circuit-connections, so that the mere act of placing the cover in position on the trough will couple the elements of the several cells contained in the trough in series relation, leaving a pair of free terminals at the respective ends of the trough. The trough is provided with handles, by which it may be readily lifted. A series of zincs or positive electrodes are attached to the cover, and are immersed in an exciting solution contained in a porous cup, one for each cell, when the cover is applied to the trough. On the bottom of a car is bolted a suitable frame or case of a size sufficient to contain the trough, and the latter is slid into this case. Between the cover of the trough and the trough itself is an acid-proof packing of soft rubber, and set-screws are provided in the under side of the case under the car, so that the battery may be raised by adjusting the screws and its cover raised into firm engagement with the bottom of the car, or lugs secured thereto, so as to press firmly together the cover and the trough and prevent leakage.

In the accompanying drawings, which illustrate my invention, Figure 1 is a view of a car, part broken away, showing the manner of supporting a group of cells. Fig. 2 is a perspective view of a group of cells. Fig. 3 is a broken longitudinal view of a group of cells, part being shown in section to illustrate the circuit-connections. Fig. 4 is a partial plan view, part in section, of a group of cells. Fig. 5 is a cross-section of the trough on a plane passing through the middle of one of the cells.

Reference being had to the drawings, 1 represents a long box or trough made of hard wood, and having its bottom and sides firmly screwed or otherwise secured together. This trough is divided transversely by partitions, as shown in Figs. 3 and 4, into a suitable number of cells, and a lining of lead, 2, is applied to the interior of each cell at its bottom and sides.

3 is the cover, large enough to cover the entire trough. To the cover, on the line where it meets the side of the trough, are attached strips of soft rubber, 4, which make a water-tight joint when the cover is pressed firmly against the top of the trough. A flange, 5, is secured to the cover at one side, so as to facilitate an accurate application to the trough and prevent lateral displacement. At equal distances in the length of the cover, corresponding to the distances between the middle points of the successive cells into which the trough is divided by the partitions, are attached plates of zinc or other soluble material, which is to serve as the positive electrode of the cells. These zincs are represented by 6 in the drawings, and are attached to the cover, as shown, by screws 7 7, and the heads of the screws are concealed from view by a box, 8, extending the length of the cover. Over this box 8, at suitable distances along the cover, are placed iron knuckles 9, which are adapted to come into engagement with the bottom of the car when the battery is placed in position under the car, and the adjusting-screws heretofore adverted to are operated. In each cell is placed a porous cup, 10, which surrounds the zinc. The carbons 11—of which there are two for each cell—are secured to the sides of the cell, being in contact with the lead lining and held in place firmly by metal bolts or screws 12 12, extending through the sides of the trough. These bolts are covered with lead or other substantially inoxidizable material, so as to prevent the solution which reaches the bolts by the capillary action of the carbon or by splashing from oxidizing the metal, and from destroying the efficiency of the contact from corroding the bolts and allowing carbons to drop loose. This lead coating or covering may be applied in any manner which is suitable—as by electro-depositing on the metal, by dipping in fluid or plastic lead, or by rolling in sheet-lead. It will be noted that carbons are electrically connected by means of the lead lining of the cell, and that they form part of an extended negative electrode having an area equal to the total area of the interior of each cell. On one side of the cell the bolts are permitted to extend through far enough for their nuts to clamp contact-pieces 15, which will presently be described. A box or cover, 13, extending the length of trough, is secured to the same, so as to hide the nuts and prevent the contacts from the influence of atmospheric changes. The nuts of the bolts 12 on one side of the trough hold in place against the trough a spring-contact, 14. There are as many of these springs as there are cells to the battery. The free end of each spring 14 bears upon a contact, 15, secured to the side of the trough and projecting vertically through the box 13. When the cover 3 is in position, the contacts 15 respectively engage strips 16, secured to the cover transversely and bent downwardly at the ends, so as to be in alignment with the contacts 15. Springs 21 bear on the strips 16, and are held in place by the screws which hold the zincs 6 against the cover. Strips 17 18 are secured to the cover in engagement with the terminal zincs at each end of the same, and these strips are bent, as shown, so as to have a horizontal surface above the cover, which will be pressed into engagement with suitable contact-plates on the bottom of the car when the battery is properly adjusted. Strips 19, of iron, are secured to the sides of the trough, to which are attached handles 20 at their ends, by which the group of cells may be shifted into or out of the casing under the car or may be carried from place to place. To the bottom of the car, as shown in Fig. 1, is bolted or otherwise secured a casing or frame-work, 23, adapted to the group of cells. In the bottom of this casing are disposed a series of set-screws, 24, which co-operate with sockets 26, attached to the bottom of the trough. When the screws are adjusted the trough is lifted and the knuckles 9 are brought into firm engagement with the bottom of the car, the cover being pressed firmly against the trough and the joint between the two firmly sealed by means of the rubber packing hereinbefore referred to.

I desire to have it understood that while I have described the battery as being placed beneath the car, and while in practice I prefer this construction from considerations of convenience, I do not limit myself solely to such an application, as in certain cases the battery might be elsewhere placed with convenience. When the cells are charged and the cover is applied, the interior circuit of the battery will be from spring 17 to the first zinc, through the first cell, to the lining and the carbons, thence to the first contact, 15, thence to the zinc of the next cell, and so on through the cells in series to the other terminal, 18.

In charging the battery, I put in the porous cup simply water. In the cell around the porous cup is placed a solution consisting of chromic acid and sulphuric acid ($CrO_3$ and $SO_3$) and water, in the following proportions: one ounce chromic acid; two ounces sulphuric acid; one quart of water. This solution makes a very active depolarizer, but if unassisted by other agents will rapidly deteriorate in depolarizing-power. To compensate for this deterioration I add to this solution on charging a compound formed of nitrate of potash and sulphuric acid. Nitrate of potash is put into the sulphuric acid in a granular or lumpy condition, and the lumps are applied to the depolarizing solution above described. I am unprepared to state exactly what chemical reaction takes place on this association; but the lumps of nitrate of potash when so acted upon seem to act as a fund of reserve energy in depolarizing-power and materially lengthen the life of the depolarizing solution. I have obtained the best results with lumps of nitrate of potash which have been soaked or acted upon by the sulphuric acid for twenty-four hours or longer.

In using my batteries in lighting-circuits I provide against any material variation in the resistance of the circuit and a consequent rapid discharge of the cells by maintaining the resistance at a practically uniform amount. I accomplish this by throwing into the circuit, when the lamp is extinguished, a resistance equal to the resistance of the lamp, as fully described in my application for incandescent electric lamps, filed July 11, 1888; but as the structural features by which this result is accomplished form no part of my present application I need not describe them herein.

While the positive solution on first charging is simply water, the acids or exciting agents in the negative solution dialyze or percolate through the fabric of the porous cell and soon surround the zinc with an active exciting-fluid.

Having thus described my invention, what I claim, and desire to secure by Letters Patent, is—

1. In a galvanic battery, a combination of a trough divided into cells by transverse partitions, a metallic lining in each cell, negative electrodes secured to the lining, a cover common to the cells, and positive electrodes secured to the cover.

2. In a galvanic battery, a combination of a trough divided into cells by transverse partitions, handles secured to the cells to facilitate transportation, a cover common to all the cells, positive and negative electrodes secured to the cover and the cells, respectively, and contacts on the cover and the trough adapted to throw all of the cells into series when the cover is applied.

3. In a galvanic battery, a combination of a trough divided into cells by transverse partitions, electrodes secured to the sides of the trough, contacts in circuit with the electrodes, a cover common to all of the cells, electrodes attached thereto, and electric connections between the electrodes carried by the cover and the side of the cover, whereby the mere placing of the cover in position will throw all of the electrodes into series relation.

4. In a galvanic battery, a containing-vessel lined with lead and having carbon electrodes secured to the side walls by lead-covered bolts, whereby an extensive negative surface is secured and the fastening devices are protected from corrosion.

5. A trough-battery having its cells grouped in the discharging-circuit by electrical connections on the outside of the trough, said connections being covered by a protective casing, as and for the purpose set forth.

6. The combination, with a vehicle, of a frame or casing on the under side thereof, a battery within the casing, and adjusting devices for locking the battery against movement in the casing.

7. The combination, with a vehicle, of a frame or casing on the under side thereof, a battery within the casing, a packing between the battery and its cover, and adjusting-screws in the bottom of the casing to press the battery against the bottom of the vehicle and prevent displacement of the battery or spilling of its contents.

8. A depolarizing-liquid for a galvanic battery, consisting of an acid solution to which is added a previously-prepared compound of nitrate of potash and sulphuric acid.

9. A depolarizing-liquid for a galvanic battery, consisting of a mixture of chromic acid, sulphuric acid, and water, and containing granules or lumps of a previously-prepared compound of nitrate of potash and sulphuric acid.

10. A depolarizing-liquid for a galvanic battery, containing a compound formed by the action of sulphuric acid on the granules or lumps of nitrate of potash.

In testimony whereof I affix my signature in presence of two witnesses.

CHARLES E. EGAN.

Witnesses:
M. P. CALLAN,
H. C. WILL.